(12) United States Patent
Liang et al.

(10) Patent No.: US 10,674,059 B2
(45) Date of Patent: Jun. 2, 2020

(54) METHOD AND DEVICE FOR CONTROLLING CAMERA AND FINANCIAL EQUIPMENT TERMINAL

(71) Applicant: GRG Banking Equipment Co., Ltd., Guangzhou, Guangdong (CN)

(72) Inventors: Tiancai Liang, Guangdong (CN); Yunyun Nie, Guangdong (CN); Yong Zhang, Guangdong (CN); Daoyu Liu, Guangdong (CN); Wenchuan Gong, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 87 days.

(21) Appl. No.: 15/774,577

(22) PCT Filed: May 10, 2016

(86) PCT No.: PCT/CN2016/081532
§ 371 (c)(1),
(2) Date: May 8, 2018

(87) PCT Pub. No.: WO2017/113559
PCT Pub. Date: Jul. 6, 2017

(65) Prior Publication Data
US 2018/0324345 A1 Nov. 8, 2018

(30) Foreign Application Priority Data
Dec. 31, 2015 (CN) .......................... 2015 1 1034588

(51) Int. Cl.
*H04N 5/232* (2006.01)
*H04N 5/235* (2006.01)

(52) U.S. Cl.
CPC ......... *H04N 5/23203* (2013.01); *H04N 5/232* (2013.01); *H04N 5/2354* (2013.01); *H04N 5/23219* (2013.01)

(58) Field of Classification Search
CPC ........... H04N 5/23203; H04N 5/23219; H04N 5/2354
See application file for complete search history.

(56) References Cited

U.S. PATENT DOCUMENTS

| 5,912,721 A | 6/1999 | Yamaguchi et al. |
| 2003/0217005 A1* | 11/2003 | Drummond ............. G06F 3/023 705/43 |

(Continued)

FOREIGN PATENT DOCUMENTS

| CN | 103248824 A | 8/2013 |
| CN | 103841313 A | 6/2014 |
| CN | 105554391 A | 5/2016 |

OTHER PUBLICATIONS

International Search Report for Application No. PCT/CN2016/081532 dated Sep. 29, 2016.

(Continued)

*Primary Examiner* — Thai Q Tran
*Assistant Examiner* — Sunghyoun Park
(74) *Attorney, Agent, or Firm* — Wolf, Greenfield & Sacks, P.C.

(57) ABSTRACT

A method for controlling a camera is provided. An image transmitted from a camera is received and detection is performed on the image, where if a target object is not detected, a search instruction for controlling the camera to rotate in a vertical direction is transmitted to the camera until the target object is detected in an image. Then posture parameters of the target object in the image are acquired, where if the posture parameters do not match a preset posture parameter criteria, a fine adjustment instruction for (Continued)

controlling the camera to rotate and move is transmitted to the camera, until the posture parameters of the target object match the preset posture parameter criteria. A device for controlling a camera and a financial device terminal are further provided.

15 Claims, 6 Drawing Sheets

(56) References Cited

U.S. PATENT DOCUMENTS

| | | | |
|---|---|---|---|
| 2006/0281969 A1 | 12/2006 | Wang et al. | |
| 2009/0102934 A1* | 4/2009 | Tsai | H04N 5/232 |
| | | | 348/211.6 |
| 2010/0110192 A1* | 5/2010 | Johnston | H04N 5/2251 |
| | | | 348/148 |
| 2010/0225773 A1 | 9/2010 | Lee | |
| 2012/0069223 A1* | 3/2012 | Yamahata | G01S 3/7864 |
| | | | 348/240.3 |
| 2013/0334973 A1* | 12/2013 | Wagenaar Cacciola | |
| | | | H05B 37/0227 |
| | | | 315/152 |
| 2014/0002687 A1 | 1/2014 | Ko | |
| 2014/0043478 A1* | 2/2014 | Burton | H04N 5/2254 |
| | | | 348/143 |
| 2015/0097666 A1* | 4/2015 | Boyd | F24F 11/30 |
| | | | 340/517 |

OTHER PUBLICATIONS

Extended European Search Report for European Application No. 16880367.4, dated Nov. 15, 2018.
PCT/CN2016/081532, dated Sep. 29, 2016, International Search Report.
EP16880367.4, dated Nov. 15, 2018, Extended European Search Report.

* cited by examiner

METHOD AND DEVICE FOR CONTROLLING CAMERA AND FINANCIAL EQUIPMENT TERMINAL

This Application is a national stage filing under 35 U.S.C. 371 of International Patent Application Serial No. PCT/CN2016/081532, filed May 10, 2016, entitled "METHOD AND DEVICE FOR CONTROLLING CAMERA AND FINANCIAL EQUIPMENT TERMINAL ". Foreign priority benefits are claimed under 35 U.S.C. § 119(a)-(d) or 35 U.S.C. § 365(b) of Chinese application number 201511034588.3, filed Dec. 31, 2015. The entire contents of these applications are incorporated herein by reference in their entirety.

FIELD

The present disclosure relates to the technical field of image processing, and in particular to a camera control method, a camera control device and a financial device terminal.

BACKGROUND

At present, the image recognition technology has been widely used in a variety of data processing systems, so that the data processing system can recognize a target object in an image and perform subsequent operations based on the recognition result.

For example, a device such as an automated teller machine may be installed with a camera. The camera transmits an acquired face image to a background server, and the background server performs identity identification based on the face image and performs operations related to withdrawing money based on the identity identification result.

It may be understood that, the quality of the image acquired by the camera may directly affect recognition efficiency and recognition accuracy of the background server. For example, whether the target object in the image acquired by the camera is complete, or whether an attitude of the target object meets requirements, may affect the image recognition effect of the background server. Therefore, it is desirable to provide a technical solution to ensure that the image acquired by the camera meets the image processing requirements.

SUMMARY

In view of this, a camera control method is provided according to the present disclosure, to ensure that the camera acquires images that meet the image processing requirements. In addition, a camera control device and a financial device terminal are further provided according to the present disclosure, so that the method can be applied and implemented in practice.

In order to achieve the above objects, the following technical solutions are provided according to the present disclosure.

According to a first aspect of the present disclosure, a camera control method is provided, which includes:

detecting whether an image transmitted by a camera contains a target object;

transmitting, if it is detected that the image transmitted by the camera does not contain the target object, one or more search instructions for controlling the camera to perform a first rotation to the camera, until the target object is detected in the image transmitted by the camera in the first rotation;

determining an attitude parameter of the target object in the image; and transmitting, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard, where the second rotation includes a movement in a vertical or horizontal direction and a rotation in a vertical or horizontal direction.

According to a second aspect of the present disclosure, a camera control device is provided, which includes: an object detecting module, a search instruction transmitting module, an attitude determining module and a fine adjustment instruction transmitting module;

the object detecting module is configured to: detect whether an image transmitted by a camera contains a target object, and trigger a search instruction transmitting module if it is detected that the image transmitted by the camera does not contain the target object;

the search instruction transmitting module is configured to transmit one or more search instructions for controlling the camera to perform a first rotation to the camera, until the target object is detected in the image transmitted by the camera in the first rotation;

the attitude determining module is configured to determine an attitude parameter of the target object in the image; and the fine adjustment instruction transmitting module is configured to transmit, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard, where the second rotation includes a movement in a vertical or horizontal direction and a rotation in a vertical or horizontal direction.

According to a third aspect of the present disclosure, a financial device terminal is provided, which includes a camera and the camera control device described above.

It can be seen from the above technical solutions that an embodiment of a camera control method is provided according to the present disclosure. According to the embodiment, an image transmitted by a camera can be received, and the received image can be detected. In a case that a target object is not detected in the image, a search instruction for controlling the camera to rotate is transmitted to the camera until the target object is detected in the image transmitted by the camera. Next, an attitude parameter of the target object in the image is determined. In a case that the attitude parameter does not meet a preset attitude parameter standard, a fine adjustment instruction for controlling the camera to rotate and move is transmitted to the camera until the attitude parameter of the target object in the image meets the preset attitude parameter standard. It can be seen that, according to the embodiment, an image acquired by a camera can be detected, that is, it is detected whether the image contains a target object and whether an attitude of the target object meets image processing requirements. A shooting angle of the camera is adjusted in the case that a detection result is negative, so that the image acquired by the camera meets the above requirements.

Practically, any product implementing the present disclosure is not required to achieve all of the advantages described above simultaneously.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described hereinafter. It is apparent that, the drawings in the following description show only some embodiments of the present disclosure, and other drawings may be obtained by those skilled in the art from the drawings without creative efforts.

DETAILED DESCRIPTION OF EMBODIMENTS

Technical solutions in embodiments of the present disclosure are clearly and completely described below in conjunction with drawings in the embodiments of the present disclosure. It is apparent that embodiments described below are only some embodiments of the present disclosure, rather than all of the embodiments. All other embodiments obtained by those skilled in the art based on the embodiments of the present disclosure without creative efforts fall within the protection scope of the present disclosure.

Figure 1:
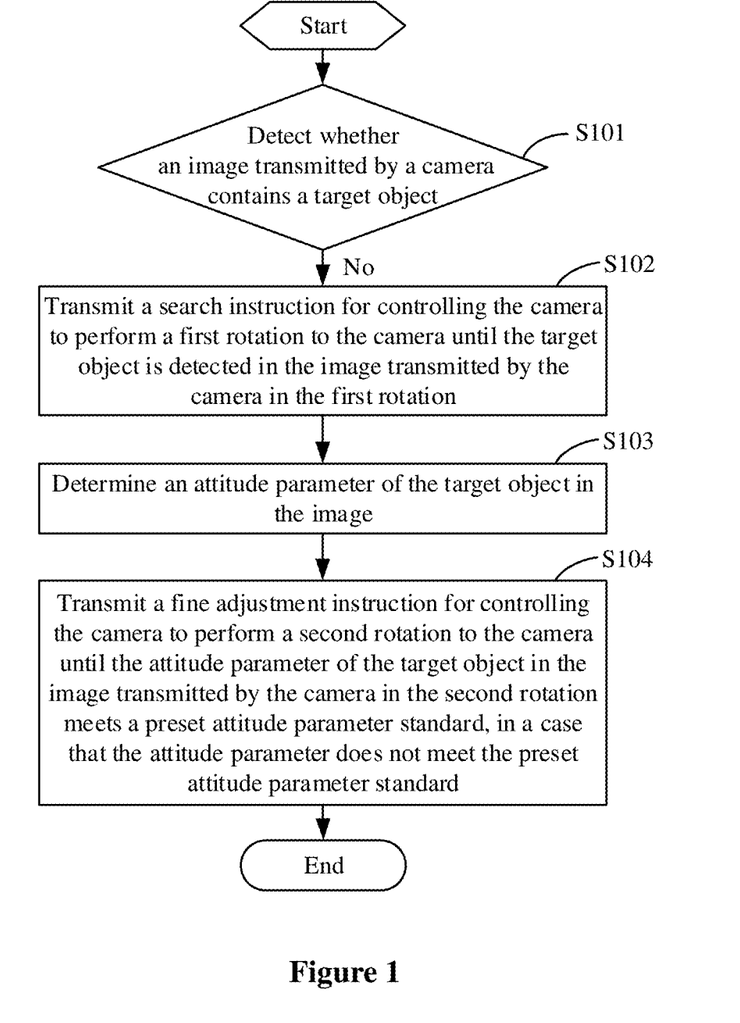
FIG. 1 is a flowchart of a first embodiment of a camera control method according to the present disclosure.

Reference is made to FIG. 1, which shows a flow a first embodiment of a camera control method according to the present disclosure. The camera control method according to the embodiment can be applied to, but not limited to, a self-service device provided with a camera, for example an automated teller machine. As shown in FIG. 1, the camera control method according to the embodiment may include steps S101 to S104.

In step S101, it is detected whether an image transmitted by a camera contains a target object. If it is detected that the image transmitted by the camera does not contain the target object, the method proceeds to step S102.

In an implementation, the camera may acquire images at a certain acquisition frequency, and transmit the acquired images to an execution module in this embodiment. The execution module in this embodiment is a camera control device which may also be referred to as a controller.

For example, a camera is installed above the automated teller machine to acquire a face image of a person standing in front of the automated teller machine and transmit the face image to the camera control device.

After the camera control device receives the image, the camera control device detects whether the image contains a target object. The target object may be, but not limited to, a human face.

Taking a human face as an example, the camera control device detects the image with a face detection algorithm to determine whether the image contains a face image. The face detection algorithm may be, but not limited to, an HARR face detection algorithm or an LBF face detection algorithm.

It should be noted that, a process of detecting whether the image contains the target object is a process of detecting whether the image contains a complete target object, for example, detecting whether the image contains a complete face contour. In a case that the complete target object is not detected, which indicates that a deviation occurs in a shooting angle of the camera, a next step is required to be performed to adjust the shooting angle of the camera.

In addition, in a case that a complete target object is detected in the image, step S102 may be skipped, and step S103 is to be performed.

In step S102, a search instruction for controlling the camera to perform a first rotation is transmitted to the camera, until the target object is detected in the image transmitted by the camera in the first rotation.

The search instruction may be executed to control the camera to rotate in any direction. In the implementation, the camera does not acquire an image containing a complete target object generally due to the height of the target object going beyond a shooting angle range of the camera. Therefore, optionally, an instruction for controlling the camera to rotate in a vertical direction may be transmitted to the camera, to control the camera to rotate in the vertical direction. For ease of description, the instruction may be referred to as a search instruction, and the rotation of the camera is referred to as a first rotation.

Taking a camera installed on an automated teller machine as an example, a height of the self-service camera is fixed, and left and right boundaries of a human face in front of the camera are generally within a horizontal shooting angle range of the camera. The camera does not acquire a complete face image generally due to upper and lower boundaries of the human face going beyond a vertical shooting angle range of the camera. For example, the chin or the forehead goes beyond the shooting angle range.

The camera control device transmits a search instruction to the camera to control the camera to rotate in the vertical direction. The vertical shooting angle of the camera changes to search for the target object.

It should be noted that, the number of search instructions transmitted by the camera control device to the camera is not limited to one, and may be more than one. Specifically, the camera control device transmits a first search instruction to the camera, and the camera rotates in the vertical direction in response to the first search instruction. The camera continually acquires images during the rotation and transmits a series of acquired images to the camera control device. In a case that the camera control device detects the target object in a certain image, the camera control device may transmit an instruction to stop the rotation to the camera.

In addition, in a case that the camera control device does not detect the target object in any one of the series of images, the camera control device may transmit a second search instruction to the camera to control the camera to rotate in the vertical direction again. The target object detection process is repeated until the target object is detected in a certain image.

It can be seen from the above process that the camera control device may transmit multiple search instructions to the camera. The search instructions each may include a vertical rotation angle ($\varphi$), and the vertical rotation angles are sequentially incremented by a fixed increment. Specifically, for example, a search instruction 1 contains $\varphi_1$, which indicates that the camera rotates in the vertical direction in an angle range of $-\varphi_1$ to $\varphi_1$;

a search instruction 2 contains $\varphi_2$, which indicates that the camera rotates in the vertical direction in an angle range of $-\varphi_2$ to $\varphi_2$;

a search instruction 3 contains $\varphi_3$, which indicates that the camera rotates in the vertical direction in an angle range of $-\varphi_3$ to $\varphi_3$;

. . .

a search instruction M contains $\varphi_M$, which indicates that the camera rotates in the vertical direction in an angle range of $-\varphi_M$ to $\varphi_M$.

In which, $\varphi_1, \varphi_2, \ldots, \varphi_M$ are sequentially incremented by a fixed increment. In addition, the vertical rotation angle may have an upper limit and a lower limit, $\varphi_1 \geq 10$, $\varphi_N \leq 75$, for example.

The search instructions may be executed according to the following rules. In a case that an i-th face detection fails, a search instruction i+1 (where i<=M−1) is executed. In addition, in a case that a search time period during which the search is performed from a first search instruction to a certain search instruction exceeds a preset time length such as 3 seconds, a prompt may be provided to adjust the position of the target object.

In a case that the camera control device detects the target object in the received image, step S103 may be performed.

In step S103, an attitude parameter of the target object in the image is determined.

The image in this step may be the image in which the camera control device detects the target object. In addition, it can be seen from the above search process that, the camera may continually acquire images at the acquisition frequency during the rotation. In a case that the camera search device detects the target object in a certain image, the camera control device may transmit an instruction to stop the rotation to the camera. Therefore, the image in which the camera control device detects the target object and an image acquired by the camera after the rotation of the camera is stopped each may serve as the image in this step.

According to a preset attitude detection algorithm, the attitude parameter of the target object is determined in the image containing the target object. The attitude parameter may include a left-and-right rotation angle and an up-and-down pitch angle of the target object. Taking a human face as an example, the attitude parameter may be a left-and-right deflection angle and a pitch angle of the face. The left-and-right deflection or the up-and-down pitch of the human face affects subsequent image processing operations, i.e., affects efficiency and accuracy of the image processing. Therefore, an attitude of the target object is required to be determined by means of the attitude parameter.

Before implementation, an attitude parameter standard is preset, and the attitude parameter standard may be set according to attitude requirements of the target object in the image proposed by a subsequent image processing module. The determined attitude parameter of the target object is compared with the preset attitude parameter standard. Taking a human face as an example, the preset attitude standard is that, the left-and-right deflection angle of the human face is within a certain range, and the pitch angle is within a certain range.

In a case that the attitude parameter of the target object does not meet the preset attitude parameter standard, which indicates that the attitude of the target object does not meet the requirement although the target object is contained in the image, step S104 is required to be performed to adjust the shooting angle of the camera again so as to acquire an image meeting the attitude requirements.

In step S104, in a case that the attitude parameter does not meet a preset attitude parameter standard, a fine adjustment instruction for controlling the camera to perform a second rotation is transmitted to the camera until the attitude parameter of the target object in the image transmitted by the camera in the second rotation meets the preset attitude parameter standard. The second rotation includes a movement in a vertical or horizontal direction and a rotation in a vertical or horizontal direction.

The camera may be required not only to move but also to rotate, so that the attitude parameter of the target object in the captured image meets the preset attitude parameter standard. Therefore, a fine adjustment instruction is required to be transmitted to the camera.

The fine adjustment instruction may be an instruction for controlling the camera to move in the vertical direction or in the horizontal direction, or an instruction for controlling the camera to rotate in the vertical direction or in the horizontal direction. A movement direction and a movement distance, as well as a rotation direction and a rotation angle are described below in details.

It can be seen from the above technical solution that an embodiment of a camera control method is provided according to the present disclosure. According to the embodiment, an image transmitted by a camera can be received, and the received image can be detected. In a case that a target object is not detected in the image, a search instruction for controlling the camera to rotate is transmitted to the camera until the target object is detected in the image transmitted by the camera. Next, an attitude parameter of the target object in the image is determined. In a case that the attitude parameter does not meet a preset attitude parameter standard, a fine adjustment instruction for controlling the camera to rotate and move is transmitted to the camera until the attitude parameter of the target object in the image meets the preset attitude parameter standard. It can be seen that, according to the embodiment, an image acquired by a camera may be detected, that is, it is detected whether the image contains a target object and whether an attitude of the target object meets image processing requirements. A shooting angle of the camera is adjusted in the case that the detection result is negative, so that the image acquired by the camera meets the above requirements.

In practice, in a process that the image processing module processes the acquired image, not only the attitude of the target object in the image is required to meet an attitude standard, but also the brightness of the light in the image is required to meet a brightness standard, thereby ensuring the accuracy of the image processing.

Figure 2:
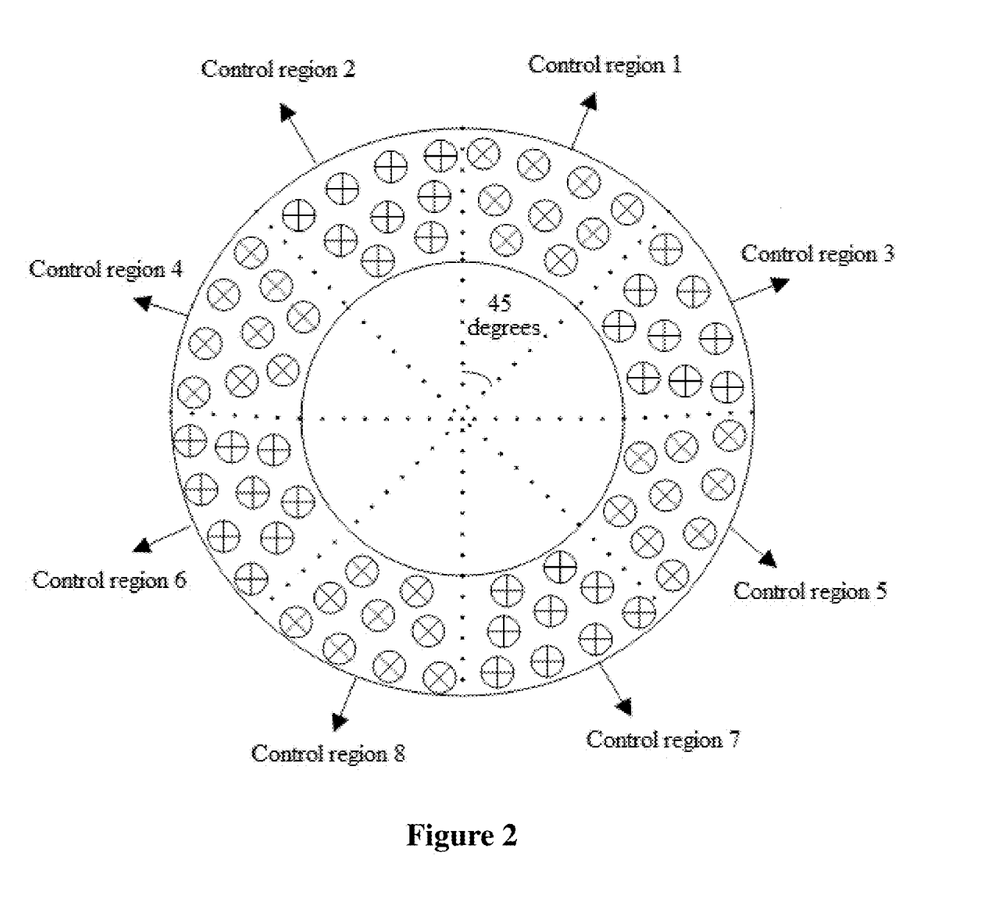
FIG. 2 is a diagram showing an exemplary arrangement of light filling lamps according to the present disclosure.

Therefore, a second embodiment of a camera control method is provided according to the present disclosure, to ensure that the brightness of the light in the image acquired by the camera meets the brightness requirements. It should be noted that, in this embodiment, one or more light filling lamps are required to be arranged in the vicinity of the camera. When the light filling lamp is turned on, the brightness of the acquired image can be increased. The arrangement of light filling lamps is shown in FIG. 2. As shown in FIG. 2, the light filling lamps may be distributed in the vicinity of the camera in the form of a loop.

Figure 3:
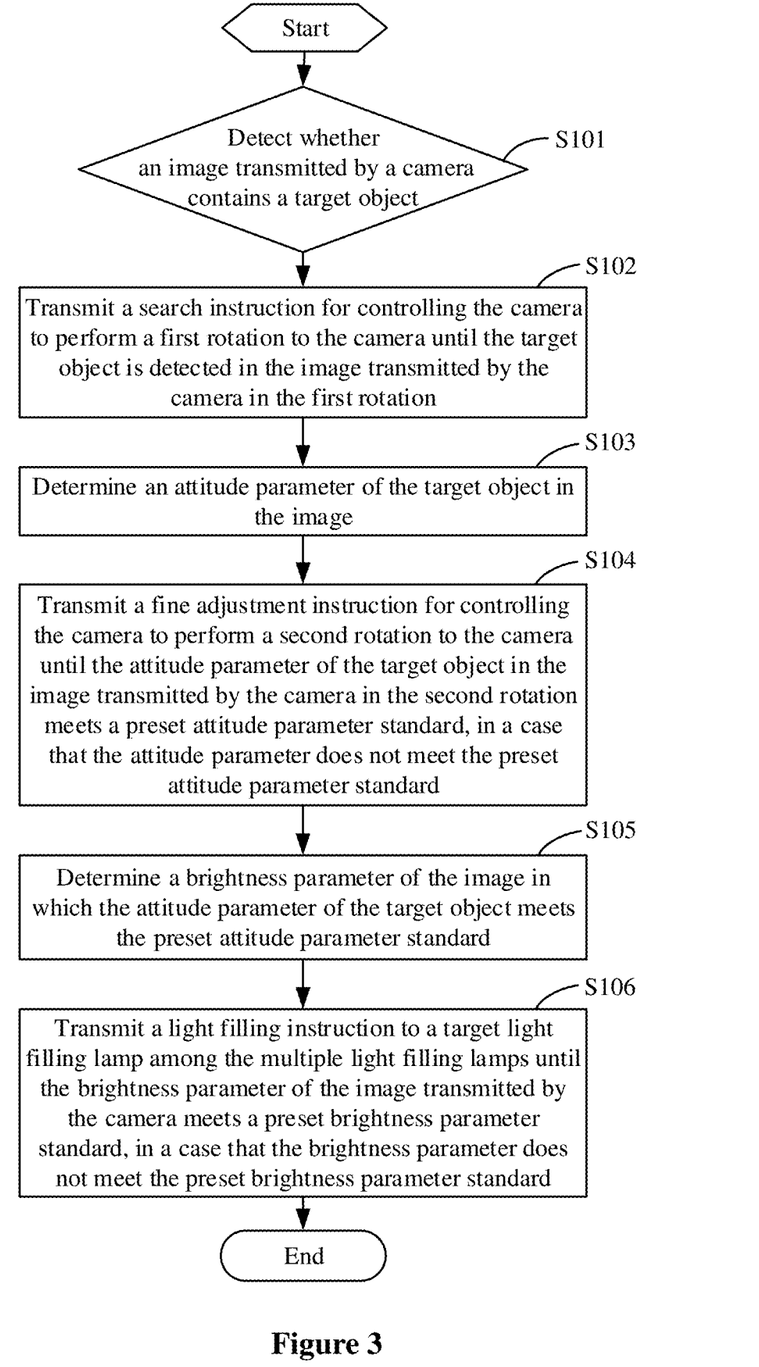
FIG. 3 is a flowchart of a second embodiment of a camera control method according to the present disclosure.

Specifically, as shown in FIG. 3, based on the first embodiment of the camera control method, the second embodiment of the camera control method may further include step S105 and step S106.

In step S105, a brightness parameter of the image in which the attitude parameter of the target object meets the preset attitude parameter standard is determined.

The image in this step is the image in which the attitude parameter of the target object meets the preset attitude parameter standard in the immediately previous step. For ease of description, the image in this step may be referred to as a target image. In addition, it can be seen from the above that, the camera may continually acquire images during the second rotation and transmits the images to the camera control device. If the camera control device detects that the attitude parameter of the target object in a certain image meets the preset attitude parameter standard, a subsequent image acquired by the camera after the certain image is detected may serve as the target image in this step.

A process of determining a brightness parameter of the image may be performed as follows. Specifically, an image region occupied by the target object in the image may be divided into a preset number of subregions, and the brightness of each subregion is calculated. In a process of calculating the brightness of each subregion, an average of brightness of all the pixels in the subregion may be calculated as the brightness of the subregion.

After the brightness of each subregion is acquired, the brightness of each subregion is compared with a preset brightness parameter standard (such as a brightness threshold). In a case that a subregion of which the brightness does not meet the brightness parameter standard exists, which indicates that the brightness parameter of the image does not meet the preset brightness parameter standard, a next step is required to be performed.

In step S106, in a case that the brightness parameter does not meet the preset brightness parameter standard, a light filling instruction is transmitted to a target light filling lamp among the multiple light filling lamps until the brightness parameter of the image transmitted by the camera meets the preset brightness parameter standard.

After the brightness comparison is completed, the subregion of which the brightness does not meet the preset brightness parameter standard is determined as a target subregion. Since the brightness of the target subregion does not meet the brightness parameter standard, the target subregion may be pointedly filled with light.

It is understood that the light filling lamp is required to be turned on for light filling. Therefore, light filling lamp(s) to be turned on should be selected from the multiple light filling lamps. For ease of description, the selected light filling lamp(s) may be referred to as the target light filling lamp(s).

Specifically, a process of determining the target light filling lamp among the multiple light filling lamps may be performed as follows.

Figure 4:
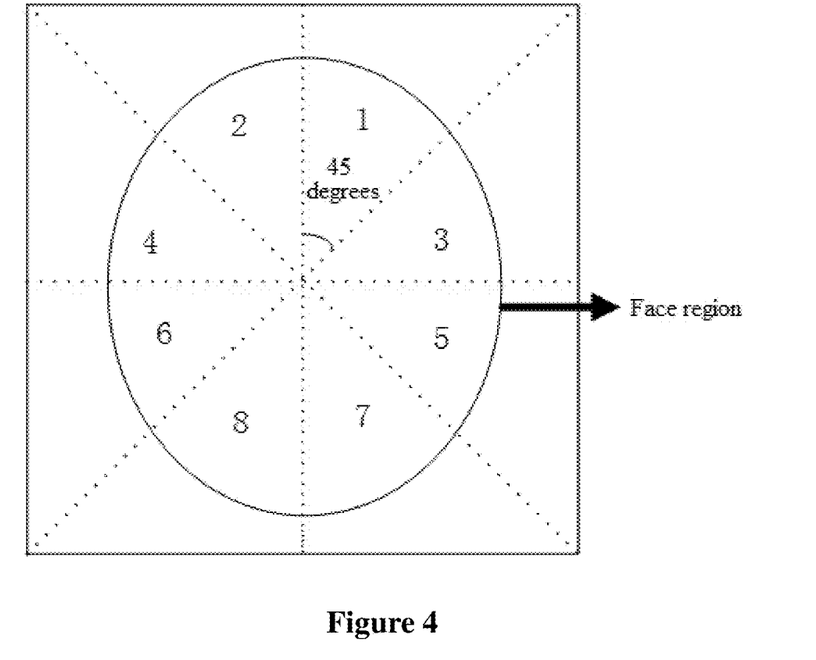
FIG. 4 is a schematic diagram showing an exemplary division of a face region according to the present disclosure.

It can be seen from the above that the image region (which may also be referred to as a target object region in the image) occupied by the target object may be divided into a preset number of subregions. Taking a human face as an example, a face region in the image may be divided into a preset number of subregions. As shown in FIG. 4, the face region in the image is equally divided into eight subregions, i.e., a subregion 1, a subregion 2, a subregion 3, . . . , and a subregion 8. Practically, processes with respect to the face region division, for example, the number of subregions into which the face region is divided, whether the face region is equally divided, may be implemented in other manners, which are not limited in the present disclosure.

Further, the light filling lamps distributed in the vicinity of the camera may be correspondingly grouped by referring to the grouping method for the target object region. The light filling lamps in the vicinity of the camera may be grouped into control regions corresponding to the subregions of the target object, and each control region corresponds to one of the subregions of the target object in the image. As shown in FIG. 2, by referring to the division method for the face region, the light filling lamps in the vicinity of the camera are grouped into eight control regions, i.e., a control region 1, a control region 2, a control region 3, . . . , and a control region 8. There is a one-to-one correspondence between the control regions and the subregions in FIG. 4.

By the brightness comparison, the target subregion of which the brightness does not meet the brightness parameter standard can be determined. The light filling lamp in the control region corresponding to the target subregion can be determined as the target light filling lamp.

After the target light filling lamp is determined, a light filling instruction may be transmitted to the target light filling lamp to turn on the target light filling lamp. In this way, the brightness of the image acquired by the camera can be improved.

It should be noted that the number of light filling instructions transmitted to the target light filling lamp may be more than one. That is, after a light filling instruction is transmitted to the target light filling lamp, an image transmitted by the camera is received, and it is determined whether the brightness parameter of the image meets the preset brightness parameter standard. In a case that the brightness parameter of the image meets the preset brightness parameter standard, the process of transmitting a light filling instruction to the target light filling lamp may be stopped. In a case that the brightness parameter of the image does not meet the preset brightness parameter standard, a light filling instruction is still required to be transmitted to the target light filling lamp until the brightness parameter of the image acquired by the camera meets the preset brightness parameter standard.

In addition, the transmitted light filling instruction may include a light filling level. Different light filling levels indicate different light filling lamp brightness. A high light filling level indicates high light filling lamp brightness. Therefore, the transmitted light filling levels for multiple light filling lamps may be sequentially incremented by a fixed increment. For example, a light filling instruction 1 includes a first light filling level;

a light filling instruction 2 includes a second light filling level;

a light filling instruction 3 includes a third light filling level;

. . .

a light filling instruction N includes an N-th light filling level.

The light filling instructions may be executed according to the following rules. In a case that the brightness of an i-th image does not meet the brightness parameter standard, an instruction i+1 (i<=N−1) is executed until the brightness meets the brightness parameter standard (where the light filling levels may be set according to actual situations).

It can be seen from the above technical solutions that, with the camera control method according to the embodiment, the light filling lamp in the vicinity of the camera may be turned on to improve the brightness of the image, in a case that the brightness of the image acquired by the camera does not meet the preset brightness standard.

By the above adjustment, not only the attitude of the target object in the image acquired by the camera meets the attitude requirements, but also the brightness of the image meets the brightness requirements. The image may be uploaded to a server for subsequent processing by the server. For example, the server compares the image with a pre-stored image to recognize the target object in the image. Practically, those skilled in the art may understand and desire for other various subsequent processing of the server without departing from the scope of protection of the present disclosure.

In the above embodiments of the camera control method, a process of generating a fine adjustment instruction in step S104 may include the following steps A1 to A6.

In step A1, a left-and-right rotation angle α is calculated from a left-and-right rotation angle calculation formula $\alpha=|\alpha_1-\alpha_2|$.

In which, $\alpha_1$ and $\alpha_2$ are respectively acquired from $$\alpha_1 = \left|\tan^{-1}\left(\frac{m_1 - m_2}{1 + m_1 m_2}\right)\right| \text{ and}$$

$$\alpha_2 = \left|\tan^{-1}\left(\frac{m_1 - m_3}{1 + m_1 m_3}\right)\right|.$$

In which, $m_1$, $m_2$ and $m_3$ are respectively acquired from $$m_1 = -\frac{x_2 - x_1}{y_2 - y_1}, \quad m_2 = -\frac{y - y_1}{x - x_1}, \text{ and}$$

$$m_3 = -\frac{y - y_2}{x - x_2}.$$

Further, (x, y), $(x_1, y_1)$, $(x_2, y_2)$ and $(x_3, y_3)$ are coordinates of a first preset position point, a second preset position point, a third preset position point, and a fourth preset position point of the target object in the image, respectively.

Taking a human face serving as the target object as an example, the first preset position point may be a left eye pupil, the second preset position point may be a right eye pupil, the third preset position point may be a nasal tip, and the fourth preset position point may be a right eyebrow center.

Optionally, the coordinates of the preset position points may be acquired with an ASM (Activy Shape Model) algorithm.

In step A2, an up-and-down pitch angle β is calculated from an up-and-down pitch angle calculation formula $$\beta = \tan^{-1}\left(\frac{m_1 - m_4}{1 + m_1 m_4}\right).$$

In which, $m_4$ is acquired from $$m_4 = -\frac{x_3 - x_1}{y_3 - y_1}.$$

After the left-and-right rotation angle α is acquired, the left-and-right rotation angle α is compared with a preset angle constant N. Based on the comparison result, step A3 or step A4 is performed to cause the camera to move and rotate horizontally.

After the up-and-down pitch angle β is acquired, the up-and-down pitch angle β is compared with the preset angle constant N. Based on the comparison result, step A5 or step A6 is performed to cause the camera to move and rotate vertically.

In step A3, in a case that the left-and-right rotation angle α≥N, a fine adjustment instruction to horizontally move leftward by a distance of $|D_{FC} \tan \alpha|$ rotate rightward by the angle of α is generated, where N is a preset constant.

In step A4, in a case that the left-and-right rotation angle α≤−N, a fine adjustment instruction to horizontally move rightward by the distance of $|D_{FC} \tan \alpha|$ and rotate leftward by the angle of α is generated.

In step A5, in a case that the up-and-down pitch angle β≥N, a fine adjustment instruction to vertically move upward by a distance of $|D_{FC} \tan \beta|$ and rotate downward by the angle of β is generated.

In step A6, in a case that the up-and-down pitch angle β≤−N, a fine adjustment instruction to vertically move downward by the distance of $|D_{FC} \tan \beta|$ and rotate upward by the angle of β is generated.

In which, $D_{FC}$ is acquired from $$D_{FC} = \frac{k(dD + mM)}{d^2 + m^2}.$$

In which, k is a property parameter of the camera; d is a distance between the first preset position point and the second preset position point in the image; D is an actual distance between the first preset position point and the second preset position point; m is a distance between a center of a connection line of the first preset position point and the second preset position point and a fifth preset position point of the target object in the image; and M is an actual distance between the center of the connection line of the first preset position point and the second preset position point and the fifth preset position point of the target object.

Taking a human face as an example, the first preset position point is a left eye pupil, the second preset position point is a right eye pupil, and the fifth preset position point is a lip. In this case, d is a distance between both eyes in the image, D is an actual distance between the eyes, m is a distance from a center of a connection line of the eyes to a center of the lip in the image, and M is an actual distance from the center of the connection line of the eyes to the center of the lip.

Figure 5:
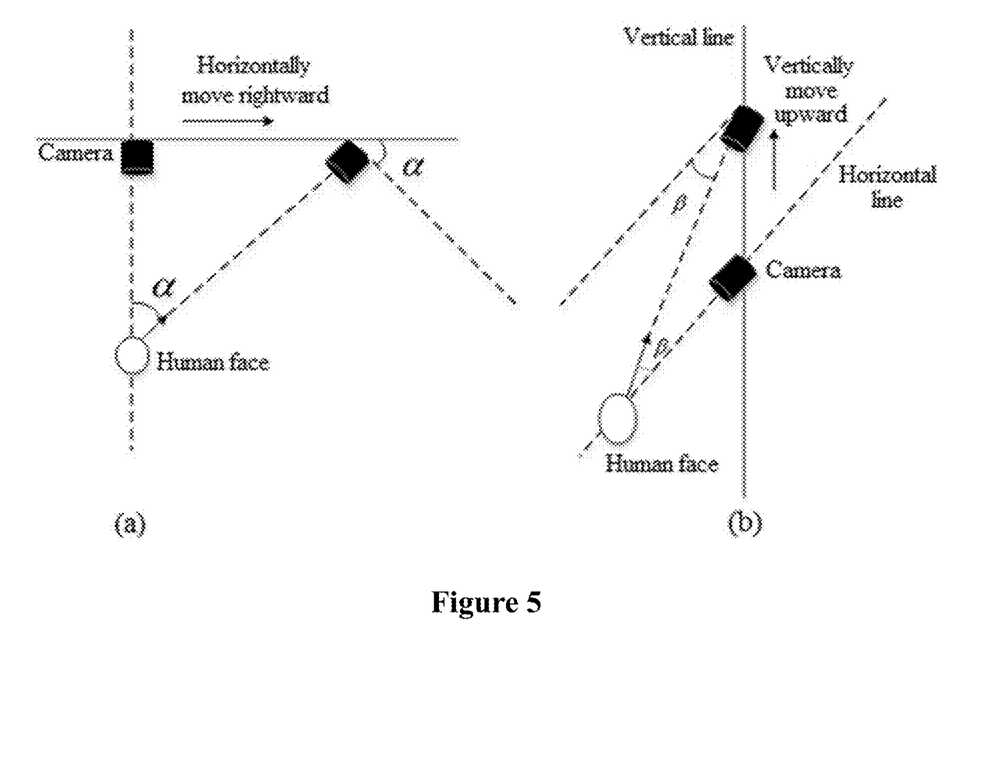
FIG. 5 is a geometric schematic diagram showing a camera fine adjustment process according to the present disclosure.

In a case that the left-and-right rotation angle α meets |α|<5 and the up-and-down pitch angle β meets |β|<5, no fine adjustment instruction is required to be generated, and the image is directly used as a target image for subsequent processing. In addition, it may be understood that the comparison results in step A3 to step A6 may indicate that the attitude parameter of the target object does not meet the attitude parameter standard. Further, for ease of understanding, a geometric schematic diagram showing a camera fine adjustment process is provided in the present disclosure, as shown in FIG. 5.

A fine adjustment instruction is generated according to the above method and is transmitted to the camera, so that the camera can acquire an image of which the attitude parameter meets the preset attitude parameter standard after finely adjusting the movement and rotation.

The camera control device and a financial device terminal according to the present disclosure are described below. It should be noted that, for the following description with respect to the camera control device and the financial device terminal, one may refer to the camera control method provided above, and the specific content is not described in detail below.

Figure 6:
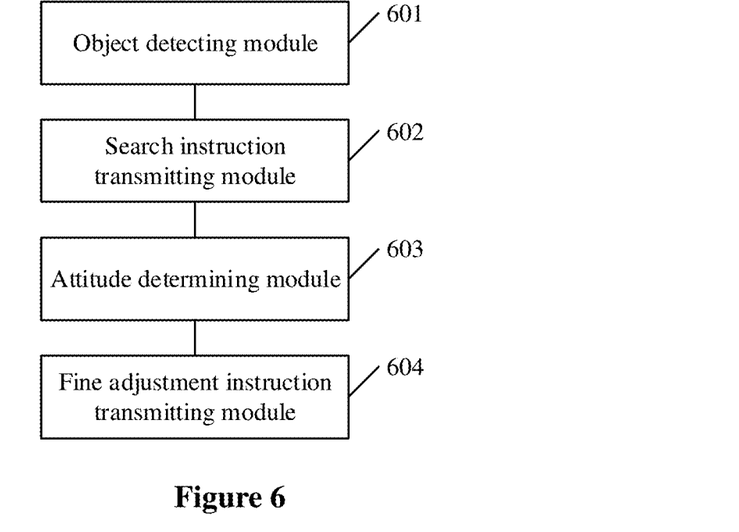
FIG. 6 is a schematic structural diagram showing a first embodiment of a camera control device according to the present disclosure.

Corresponding to the first embodiment of the camera control method, a first embodiment of a camera control device is provided according to the present disclosure. As shown in FIG. 6, the camera control device according to the embodiment may include an object detecting module 601, a search instruction transmitting module 602, an attitude determining module 603 and a fine adjustment instruction transmitting module 604.

The object detecting module 601 is configured to: detect whether an image transmitted by a camera contains a target object, and trigger a search instruction transmitting module if it is detected that the image transmitted by the camera does not contain the target object.

The search instruction transmitting module 602 is configured to transmit a search instruction for controlling the camera to perform a first rotation to the camera, until the target object is detected in the image transmitted by the camera in the first rotation.

The attitude determining module 603 is configured to determine an attitude parameter of the target object in the image.

The fine adjustment instruction transmitting module 604 is configured to transmit, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard. The second rotation includes a movement in a vertical or horizontal direction and a rotation in a vertical or horizontal direction.

It can be seen from the above technical solution that an embodiment of a camera control device is provided according to the present disclosure. According to the embodiment, the object detecting module 601 can receive an image transmitted by a camera and detect the image. In a case that a target object is not detected in the image, the search instruction transmitting module 602 transmits a search instruction for controlling the camera to rotate to the camera, until the target object is detected in the image transmitted by the camera. Next, the attitude determining module 603 acquires an attitude parameter of the target object in the image. In a case that the attitude parameter does not meet a preset attitude parameter standard, the fine adjustment instruction transmitting module 604 transmits a fine adjustment instruction for controlling the camera to rotate and move to the camera, until the attitude parameter of the target object in the image meets the preset attitude parameter standard. It can be seen that, according to the embodiment, an image acquired by a camera can be detected, that is, it is detected whether the image contains a target object and whether an attitude of the target object meets image processing requirements. A shooting angle of the camera is adjusted in the case that the detection result is negative, so that the image acquired by the camera meets the above requirements.

Figure 7:
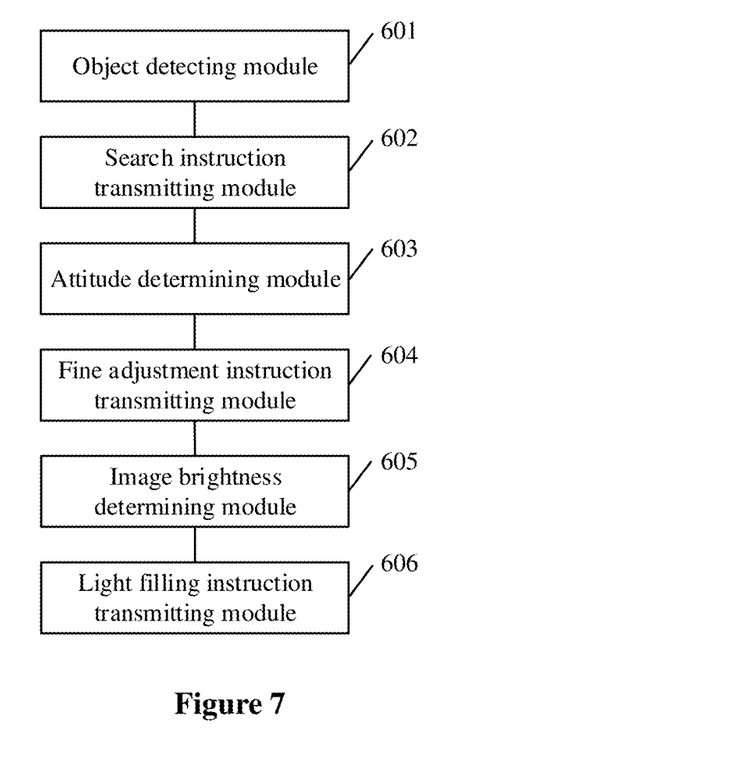
FIG. 7 is a schematic structural diagram showing a second embodiment of a camera control device according to the present disclosure.

Corresponding to the second embodiment of the camera control method, a second embodiment of a camera control device is provided according to the present disclosure. Multiple light filling lamps are arranged in the vicinity of the camera in the embodiment.

As shown in FIG. 7, based on the first embodiment of the camera control device, the camera control device according to the second embodiment may further include an image brightness determining module 605 and a light filling instruction transmitting module 606.

The image brightness determining module 605 is configured to determine a brightness parameter of the image in which the attitude parameter of the target object meets the preset attitude parameter standard.

The light filling instruction transmitting module 606 is configured to transmit, in a case that the brightness parameter does not meet a preset brightness parameter standard, a light filling instruction to a target light filling lamp among the multiple light filling lamps, until the brightness parameter of the image transmitted by the camera meets the preset brightness parameter standard.

In addition, the camera control device may further include an image uploading module.

The image uploading module is configured to upload the image of which the brightness parameter meets the preset brightness parameter standard to a server.

In practice, the search instructions transmitted by the search instruction transmitting module 602 to the camera each include a vertical rotation angle, and the vertical rotation angles are sequentially incremented by a fixed increment.

The fine adjustment instruction transmitting module 604 generates a fine adjustment instruction in the following way.

A left-and-right rotation angle $\alpha$ is calculated from a left-and-right rotation angle calculation formula $\alpha = |\alpha_1 - \alpha_2|$.

In which, $\alpha_1$ and $\alpha_2$ are respectively acquired from $$\alpha_1 = \left|\tan^{-1}\left(\frac{m_1 - m_2}{1 + m_1 m_2}\right)\right| \text{ and}$$

$$\alpha_2 = \left|\tan^{-1}\left(\frac{m_1 - m_3}{1 + m_1 m_3}\right)\right|.$$

In which, $m_1$, $m_2$ and $m_3$ are respectively acquired from $$m_1 = -\frac{x_2 - x_1}{y_2 - y_1},$$

$$m_2 = -\frac{y - y_1}{x - x_1}, \text{ and } m_3 = -\frac{y - y_2}{x - x_2}.$$

Further, $(x, y)$, $(x_1, y_1)$, $(x_2, y_2)$ and $(x_3, y_3)$ are coordinates of a first preset position point, a second preset position point, a third preset position point, and a fourth preset position point of the target object in the image, respectively.

An up-and-down pitch angle $\beta$ is calculated from an up-and-down pitch angle calculation formula $$\beta = \tan^{-1}\left(\frac{m_1 - m_4}{1 + m_1 m_4}\right).$$

In which, $m_4$ is acquired from $$m_4 = -\frac{x_3 - x_1}{y_3 - y_1}.$$

In a case that the left-and-right rotation angle $\alpha \geq N$, a fine adjustment instruction to horizontally move leftward by a distance of $|D_{FC} \tan \alpha|$ and rotate rightward by the angle of $\alpha$ is generated, where N is a preset constant.

In a case that the left-and-right rotation angle α≤−N, a fine adjustment instruction to horizontally move rightward by the distance of $|D_{FC} \tan \alpha|$ and rotate leftward by the angle of α is generated.

In a case that the up-and-down pitch angle β≥N, a fine adjustment instruction to vertically move upward by a distance of $|D_{FC} \tan \beta|$ and rotate downward by the angle of β is generated.

In a case that the up-and-down pitch angle β≤−N, a fine adjustment instruction to vertically move downward by the distance of $|D_{FC} \tan \beta|$ and rotate upward by the angle of β is generated.

In which, $D_{FC}$ is acquired from $$D_{FC} = \frac{k(dD + mM)}{d^2 + m^2}.$$

In which, d is a distance between the first preset position point and the second preset position point in the image; D is an actual distance between the first preset position point and the second preset position point; m is a distance between a center of a connection line of the first preset position point and the second preset position point and a fifth preset position point of the target object in the image; and M is an actual distance between the center of the connection line of the first preset position point and the second preset position point and the fifth preset position point of the target object.

In addition, the target object occupies multiple image regions in the image, and the image regions correspond to the multiple light filling lamps. The light filling instruction transmitting module 606 determines a target light filling lamp among the multiple light filling lamps in the following way.

A region brightness parameter of each of the image regions of the target object is determined.

The light filling lamp corresponding to the image region of which the region brightness parameter is less than the preset brightness parameter is determined as the target flight filling lamp.

In addition, the light filling instructions transmitted by the light filling instruction transmitting module 606 to the target light filling lamp each include a light filling level, and the light filling levels are sequentially incremented by a fixed increment.

In addition, a financial device terminal is further provided according to the present disclosure. The financial device terminal includes a camera and any one camera control device described above.

It should be noted that embodiments in this specification are described in a progressive manner, each of the embodiments emphasizes differences between the embodiment and other embodiments, and the same or similar parts among the embodiments can be referred to each other.

It should further be noted that relationship terms such as "first", "second" and the like are only intended to distinguish an entity or operation from another, rather than to indicate that such an actual relationship or order exists among the entities or operations. Furthermore, terms such as "include", "comprise" or any other variants are intended to be non-exclusive. Therefore, a process, method, article or device including multiple elements includes not only the elements but also other elements that are not enumerated, or further includes the elements inherent for the process, method, article or device. Unless expressively limited otherwise, the statement "comprising (including) a ..." does not exclude a case where other similar elements may exist in the process, method, article or device.

Based on the above description of the disclosed embodiments, those skilled in the art can carry out or use the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A camera control method, comprising:
   detecting whether an image transmitted by a camera contains a target object;
   transmitting, if it is detected that the image transmitted by the camera does not contain the target object, one or more search instructions for controlling the camera to perform a first rotation to the camera, until the target object is detected in the image transmitted by the camera in the first rotation;
   determining an attitude parameter of the target object in the image; and
   transmitting, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard, wherein the second rotation comprises a movement in a vertical or horizontal direction and a rotation in a vertical or horizontal direction, wherein generating the fine adjustment instruction comprises:
   calculating a left-and-right rotation angle α from a left-and-right rotation angle calculation formula $\alpha = |\alpha_1 - \alpha_2|$, wherein $\alpha_1$ and $\alpha_2$ are respectively acquired from $$\alpha_1 = \left|\tan^{-1}\left(\frac{m_1 - m_2}{1 + m_1 m_2}\right)\right| \text{ and } \alpha_2 = \left|\tan^{-1}\left(\frac{m_1 - m_3}{1 + m_1 m_3}\right)\right|,$$

$m_1$, $m_2$ and $m_3$ are respectively acquire from $$m_1 = -\frac{x_2 - x_1}{y_2 - y_1}, m_2 = -\frac{y - y_1}{x - x_1}, \text{ and } m_3 = -\frac{y - y_2}{x - x_2},$$

and (x, y), $(x_1, y_1)$ $(x_2, y_2)$ and $(x_3, y_3)$ are coordinates of a first preset position point, a second preset position point, a third preset position point, and a fourth preset position point of the target object in the image, respectively;

calculating an up-and-down pitch angle β from an up-and-down pitch angle calculation formula $$\beta = \tan^{-1}\left(\frac{m_1 - m_4}{1 + m_1 m_4}\right),$$

wherein $m_4$ is acquired from $$m_4 = -\frac{x_3 - x_1}{y_3 - y_1};$$

generating a fine adjustment instruction to horizontally move leftward by a distance of $|D_{FC} \tan \alpha|$ and rotate rightward by the angle of $\alpha$, in a case of the left-and-right rotation angle $\alpha \geq N$, where N is a preset constant;

generating a fine adjustment instruction to horizontally move rightward by the distance of $|D_{FC} \tan \alpha|$ and rotate leftward by the angle of $\alpha$, in a case of the left-and-right rotation angle $\alpha \leq -N$;

generating a fine adjustment instruction to vertically move upward by a distance of $|D_{FC} \tan \beta|$ and rotate downward by the angle of $\beta$, in a case of the up-and-down pitch angle $\beta \geq N$; and generating a fine adjustment instruction to vertically move downward by the distance of $|D_{FC} \tan \beta|$ and rotate upward by the angle of $\beta$, in a case of the up-and-down pitch angle $\beta \leq -N$, wherein $D_{FC}$ is acquired from $$D_{FC} = \frac{k(dD + mM)}{d^2 + m^2};$$

d is a distance between the first preset position point and the second preset position point in the image; D is an actual distance between the first preset position point and the second preset position point; m is a distance between a center of a connection line of the first preset position point and the second preset position point and a fifth preset position point of the target object in the image; and M is an actual distance between the center of the connection line of the first preset position point and the second preset position point and the fifth preset position point of the target object.

2. The camera control method according to claim 1, wherein a plurality of light filling lamps are arranged in vicinity of the camera, and the method further comprises:
determining a brightness parameter of the image in which the attitude parameter of the target object meets the preset attitude parameter standard; and
transmitting, in a case that the brightness parameter does not meet a preset brightness parameter standard, one or more light filling instructions to a target light filling lamp among the plurality of light filling lamps, until the brightness parameter of the image transmitted by the camera meets the preset brightness parameter standard.

3. The camera control method according to claim 2, wherein the target object occupies a plurality of image regions in the image, and the image regions correspond to the plurality of light filling lamps, and wherein determining a target light filling lamp among the plurality of light filling lamps comprises:
determining a region brightness parameter of each of the image regions of the target object; and
determining the light filling lamp corresponding to the image region of which the region brightness parameter is less than the preset brightness parameter as the target light filling lamp.

4. The camera control method according to claim 2, wherein the light filling instructions transmitted to the target light filling lamp comprise light filling levels, and the light filling levels are sequentially incremented by a fixed increment.

5. The camera control method according to claim 1, wherein the search instructions transmitted to the camera comprise vertical rotation angles, and the vertical rotation angles are sequentially incremented by a fixed increment.

6. A camera control device, comprising:
an object detecting module configured to: detect whether an image transmitted by a camera contains a target object, and trigger a search instruction transmitting module if it is detected that the image transmitted by the camera does not contain the target object;
a search instruction transmitting module configured to transmit one or more search instructions for controlling the camera to perform a first rotation to the camera, until the target object is detected in the image transmitted by the camera in the first rotation;
an attitude determining module configured to determine an attitude parameter of the target object in the image; and
a fine adjustment instruction transmitting module configured to transmit, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard, wherein the second rotation comprises a movement in a vertical or horizontal direction and a rotation in a vertical or horizontal direction,
wherein for generating a fine adjustment instruction, the fine adjustment instruction transmitting module is configured to:
calculate a left-and-right rotation angle $\alpha$ from a left-and-right rotation angle calculation formula $\alpha = |\alpha_1 - \alpha_2|$, wherein $\alpha_1$ and $\alpha_2$ are respectively acquired from $$\alpha_1 = \left|\tan^{-1}\left(\frac{m_1 - m_2}{1 + m_1 m_2}\right)\right| \text{ and } \alpha_2 = \left|\tan^{-1}\left(\frac{m_1 - m_3}{1 + m_1 m_3}\right)\right|,$$

$m_1$, $m_2$ and $m_3$ are respectively acquire from $$m_1 = -\frac{x_2 - x_1}{y_2 - y_1}, m_2 = -\frac{y - y_1}{x - x_1}, \text{ and } m_3 = -\frac{y - y_2}{x - x_2},$$

and (x, y), $(x_1, y_1)$ $(x_2, y_2)$ and $(x_3, y_3)$ are coordinates of a first preset position point, a second preset position point, a third preset position point, and a fourth preset position point of the target object in the image, respectively;
calculating an up-and-down pitch angle $\beta$ from an up-and-down pitch angle calculation formula $$\beta = \tan^{-1}\left(\frac{m_1 - m_4}{1 + m_1 m_4}\right),$$

wherein $m_4$ is acquired from $$m_4 = -\frac{x_3 - x_1}{y_3 - y_1};$$

generating a fine adjustment instruction to horizontally move leftward by a distance of $|D_{FC} \tan \alpha|$ and rotate rightward by the angle of $\alpha$, in a case of the left-and-right rotation angle $\alpha \geq N$, where N is a preset constant;
generating a fine adjustment instruction to horizontally move rightward by the distance of $|D_{FC} \tan \alpha|$ and rotate leftward by the angle of α, in a case of the left-and-right rotation angle α≤−N;

generating a fine adjustment instruction to vertically move upward by a distance of |$D_{FC}$ tan β| and rotate downward by the angle of β, in a case of the up-and-down pitch angle β≥N; and generating a fine adjustment instruction to vertically move downward by the distance of |$D_{FC}$ tan β| and rotate upward by the angle of β, in a case of the up-and-down pitch angle β≤−N, wherein $D_{FC}$ is acquired from $$D_{FC} = \frac{k(dD + mM)}{d^2 + m^2};$$

d is a distance between the first preset position point and the second preset position point in the image; D is an actual distance between the first preset position point and the second preset position point; m is a distance between a center of a connection line of the first preset position point and the second preset position point and a fifth preset position point of the target object in the image; and M is an actual distance between the center of the connection line of the first preset position point and the second preset position point and the fifth preset position point of the target object.

7. The camera control device according to claim 6, wherein a plurality of light filling lamps are arranged in vicinity of the camera, and the device further comprises:

an image brightness determining module configured to determine a brightness parameter of the image in which the attitude parameter of the target object meets the preset attitude parameter standard; and a light filling instruction transmitting module configured to transmit, in a case that the brightness parameter does not meet a preset brightness parameter standard, one or more light filling instructions to a target light filling lamp among the plurality of light filling lamps, until the brightness parameter of the image transmitted by the camera meets the preset brightness parameter standard.

8. The camera control device according to claim 7, wherein the target object occupies a plurality of image regions in the image, and the image regions correspond to the plurality of light filling lamps, and wherein for determining a target light filling lamp among the plurality of light filling lamps, the light filling instruction transmitting module is configured to:

determine a region brightness parameter of each of the image regions of the target object; and determine the light filling lamp corresponding to the image region of which the region brightness parameter is less than the preset brightness parameter as the target light filling lamp.

9. The camera control device according to claim 7, wherein the light filling instructions transmitted by the light filling instruction transmitting module to the target light filling lamp comprise light filling levels, and the light filling levels are sequentially incremented by a fixed increment.

10. The camera control device according to claim 6, wherein the search instructions transmitted by the search instruction transmitting module to the camera comprise vertical rotation angles, and the vertical rotation angles are sequentially incremented by a fixed increment.

11. A financial device terminal, comprising:

a camera, and a camera control device, wherein the camera control device comprises:

an object detecting module configured to: detect whether an image transmitted by a camera contains a target object, and trigger a search instruction transmitting module if it is detected that the image transmitted by the camera does not contain the target object;

a search instruction transmitting module configured to transmit one or more search instructions for controlling the camera to perform a first rotation to the camera, until the target object is detected in the image transmitted by the camera in the first rotation;

an attitude determining module configured to determine an attitude parameter of the target object in the image; and a fine adjustment instruction transmitting module configured to transmit, in a case that the attitude parameter does not meet a preset attitude parameter standard, a fine adjustment instruction for controlling the camera to perform a second rotation to the camera, until the attitude parameter of the target object in the image transmitted by the camera in the second rotation meets the preset attitude parameter standard, wherein the second rotation comprises a movement in a vertical or horizontal direction and a rotation in a vertical or horizontal direction, wherein for generating a fine adjustment instruction, the fine adjustment instruction transmitting module is configured to:

calculating a left-and-right rotation angle α from a left-and-right rotation angle calculation formula α=|$α_1 − α_2$|, wherein $α_1$ and $α_2$ are respectively acquired from $$\alpha_1 = \left|\tan^{-1}\left(\frac{m_1 - m_2}{1 + m_1 m_2}\right)\right| \text{ and } \alpha_2 = \left|\tan^{-1}\left(\frac{m_1 - m_3}{1 + m_1 m_3}\right)\right|,$$

$m_1$, $m_2$ and $m_3$ are respectively acquire from $$m_1 = -\frac{x_2 - x_1}{y_2 - y_1}, m_2 = -\frac{y - y_1}{x - x_1}, \text{ and } m_3 = -\frac{y - y_2}{x - x_2},$$

and (x, y), ($x_1$, $y_1$) ($x_2$, $y_2$) and ($x_3$, $y_3$) are coordinates of a first preset position point, a second preset position point, a third preset position point, and a fourth preset position point of the target object in the image, respectively;

calculating an up-and-down pitch angle β from an up-and-down pitch angle calculation formula $$\beta = \tan^{-1}\left(\frac{m_1 - m_4}{1 + m_1 m_4}\right),$$

wherein $m_4$ is acquired from $$m_4 = -\frac{x_3 - x_1}{y_3 - y_1};$$

generating a fine adjustment instruction to horizontally move leftward by a distance of |$D_{FC}$ tan ⊕| and rotate rightward by the angle of α, in a case of the left-and-right rotation angle α≥N, where N is a preset constant;

generating a fine adjustment instruction to horizontally move rightward by the distance of |$D_{FC}$ tan α| and rotate leftward by the angle of α, in a case of the left-and-right rotation angle α≤−N;

generating a fine adjustment instruction to vertically move upward by a distance of $|D_{FC} \tan \beta|$ and rotate downward by the angle of $\beta$, in a case of the up-and-down pitch angle $\beta \geq N$; and generating a fine adjustment instruction to vertically move downward by the distance of $|D_{FC} \tan \beta|$ and rotate upward by the angle of $\beta$, in a case of the up-and-down pitch angle $\beta \leq -N$, wherein $D_{FC}$ is acquired from $$D_{FC} = \frac{k(dD + mM)}{d^2 + m^2};$$

d is a distance between the first preset position point and the second preset position point in the image; D is an actual distance between the first preset position point and the second preset position point; m is a distance between a center of a connection line of the first preset position point and the second preset position point and a fifth preset position point of the target object in the image; and M is an actual distance between the center of the connection line of the first preset position point and the second preset position point and the fifth preset position point of the target object.

12. The financial device terminal according to claim 11, wherein a plurality of light filling lamps are arranged in vicinity of the camera, and the camera control device further comprises:

an image brightness determining module configured to determine a brightness parameter of the image in which the attitude parameter of the target object meets the preset attitude parameter standard; and a light filling instruction transmitting module configured to transmit, in a case that the brightness parameter does not meet a preset brightness parameter standard, one or more light filling instructions to a target light filling lamp among the plurality of light filling lamps, until the brightness parameter of the image transmitted by the camera meets the preset brightness parameter standard.

13. The financial device terminal according to claim 12, wherein the target object occupies a plurality of image regions in the image, and the image regions correspond to the plurality of light filling lamps, and wherein for determining a target light filling lamp among the plurality of light filling lamps, the light filling instruction transmitting module is configured to:

determine a region brightness parameter of each of the image regions of the target object; and determine the light filling lamp corresponding to the image region of which the region brightness parameter is less than the preset brightness parameter as the target light filling lamp.

14. The financial device terminal according to claim 12, wherein the light filling instructions transmitted by the light filling instruction transmitting module to the target light filling lamp comprise light filling levels, and the light filling levels are sequentially incremented by a fixed increment.

15. The financial device terminal according to claim 11, wherein the search instructions transmitted by the search instruction transmitting module to the camera comprise vertical rotation angles, and the vertical rotation angles are sequentially incremented by a fixed increment.

* * * * *